(12) United States Patent
Do et al.

(10) Patent No.: US 10,989,655 B2
(45) Date of Patent: Apr. 27, 2021

(54) METHOD FOR ANALYZING INFRARED SPECTROSCOPY SPECTRUM OF POLYACRYLONITRILE-BASED FIBER

(71) Applicant: LG CHEM, LTD., Seoul (KR)

(72) Inventors: Jong Soo Do, Daejeon (KR); Sung Joon Oh, Daejeon (KR)

(73) Assignee: LG CHEM, LTD., Seoul (KR)

( * ) Notice: Subject to any disclaimer, the term of this patent is extended or adjusted under 35 U.S.C. 154(b) by 49 days.

(21) Appl. No.: 16/604,080

(22) PCT Filed: Dec. 20, 2018

(86) PCT No.: PCT/KR2018/016395
§ 371 (c)(1),
(2) Date: Oct. 9, 2019

(87) PCT Pub. No.: WO2019/132429
PCT Pub. Date: Jul. 4, 2019

(65) Prior Publication Data
US 2020/0393370 A1 Dec. 17, 2020

(30) Foreign Application Priority Data

Dec. 26, 2017 (KR) .......................... 10-2017-0179770

(51) Int. Cl.
*G01N 21/3563* (2014.01)
*G01N 21/3577* (2014.01)
(Continued)

(52) U.S. Cl.
CPC ..... *G01N 21/3563* (2013.01); *G01N 21/3577* (2013.01); *G01N 21/552* (2013.01);
(Continued)

(58) Field of Classification Search
CPC .......... G01N 21/3563; G01N 21/3577; G01N 21/552; G01N 21/84; G01N 2021/8444; G01N 2201/0636
See application file for complete search history.

(56) References Cited

U.S. PATENT DOCUMENTS

2004/0149911 A1* 8/2004 Irie .................... G01N 21/3563
250/339.12
2016/0089088 A1* 3/2016 Kim .................... A61B 5/7278
600/473

FOREIGN PATENT DOCUMENTS

JP         5176562 B2    4/2013
JP     2015197364 A    11/2015
(Continued)

OTHER PUBLICATIONS

Sunil A. Patil, et al.: "Eiectrospun carbon nanofibers from polyacrylonitrile blended with activated or graphitized carbonaceous materials for improving anodic bioelectrocatalysis", Bioresource Technology, Elsevier, Amsterdam, NL, vol. 132, Jan. 7, 2013, pp. 121-126, XP028990208.
(Continued)

*Primary Examiner* — Dominic J Bologna
(74) *Attorney, Agent, or Firm* — Dentons US LLP

(57) ABSTRACT

The present invention relates to a method for characterizing a polyacrylonitrile-based fiber, the method having a reduced error. In a spectroscopic analysis method for a polyacrylonitrile-based fiber according to the present invention, a contact degree between an inspection target and an attenuated total reflection crystal is predicted through Equation 2 and is applied to Equation 1 to correct a spectrum peak height, and thus, the peak height of the infrared spectroscopy spectrum may be measured with repeatability.

6 Claims, 3 Drawing Sheets

(51) Int. Cl.
*G01N 21/552* (2014.01)
*G01N 21/84* (2006.01)
(52) U.S. Cl.
CPC ..... *G01N 21/84* (2013.01); *G01N 2021/8444* (2013.01); *G01N 2201/0636* (2013.01)

(56) References Cited

FOREIGN PATENT DOCUMENTS

| KR | 10-2004-0026868 A | 4/2004 |
|----|-------------------|--------|
| KR | 10-0591357 B1 | 6/2006 |
| KR | 10-2013-0020868 A | 3/2013 |
| KR | 10-2016-0037576 A | 4/2016 |

OTHER PUBLICATIONS

Sunil A. Patil, et al.: "Supplementary information (SI) of "Electrospun carbon nanofibers from polyacrylonitrile blended with activated or graphitized carbonaceous materials for improving anodic bioelectrocatalysis"", Jan. 7, 2013, pp. 1-7, XP055674095.

A.A. Stolov, et al.: "Application of Micro-Attenuated Total Reflectance Infrared Spectroscopy to Quantitative Analysis of Optical Fiber Coatings: Effects of Optical Contact", Applied Spectroscopy, Jan. 31, 2006, pp. 29-38, XP055674110.

Stolov, A.A., Simoff, D.A.: "Chapter 18: Infrared ATR and Reflection Micro-Spectroscopy as In Situ Characterization Techniques for Optical Fibers and Their Coatings" In: "Infrared Spectroscopy: Theory, Developments and Applications", Mar. 1, 2014, Nova Science Publishers, Inc., pp. 403-468, XP0009519241.

\* cited by examiner

METHOD FOR ANALYZING INFRARED SPECTROSCOPY SPECTRUM OF POLYACRYLONITRILE-BASED FIBER

The present application is a National Phase entry pursuant to 35 U.S.C. § 371 of PCT/KR2018/016395, filed on Dec. 20, 2018, and claims the benefit of Korean Patent Application No. 10-2017-0179770, filed on Dec. 26, 2017, in the Korean Intellectual Property Office, the disclosures of which are incorporated herein in their entirety by reference.

FIELD

The present invention relates to a method for analyzing an infrared spectroscopy spectrum of a polyacrylonitrile-based fiber, the method having a reduced error.

BACKGROUND

By virtue of continuous application development efforts seeking to take advantage of fully employing characteristics, such as light weight, high strength, and high heat resistance, carbon fibers are being widely used in various industrial fields from aerospace to construction industries, including civil engineering and construction. Such fields include construction materials concrete structures, earth-quake reinforcements, alternative energy and green energy fields such as CNG tanks, wind power generation blades, centrifugal rotors, flywheels, high-speed transportation apparatus fields, such as ships, vehicles, ocean development and deep sea oilfield development, high performance apparatus, medical welfare apparatuses, electricity conduction applications, ultra heat resistance, and the like. Carbon fiber is widening its application as a third general-purpose material forming a basis for new era that is capable of replacing iron, aluminum, or the like by virtue the unparalleled characteristics thereof. In particular, it is expected that the carbon fiber will be employed as a component material for aircrafts such as the Boeing 787 and Airbus 380, which are ultrasonic aircraft, and thus the amount of carbon fiber used in various advanced material fields will increase.

Polyacrylonitrile-based precursor fiber (hereinafter, referred to as PAN fiber) known as most suitable precursors in producing carbon fiber is converted into a carbon fiber or graphite fiber via a series of stabilization or oxidation and carbonization, and selectively via a graphitizing process stage and a series of surface treatment and sizing process stages.

In addition, according to the cost structure of carbon fibers, the PAN fiber is the largest weight of about 43%, and hence in order to obtain a carbon fiber with excellent physical properties, it is essential to secure the PAN fiber technology. As a way of securing PAN fiber technology, it is necessary to accurately understand the molecular structure of PAN fiber, and to use this well-understood molecular structure to produce PAN fiber having excellent physical properties.

Infrared spectroscopy is a technology with which spectra are measured over an infrared wavelength range, and from the measurement results, and an energy level distribution of a material, transitions between energy levels (transition from a low vibration energy level to a higher vibration energy level) can be analyzed. For example, intra-molecule functional groups or the like may be analyzed on the basis of energy absorbed when molecular bonds in a compound is in bending vibration or stretching vibration.

That is, determining the molecular structure of a compound, for example, a polymer, is an important issue in science and industry, and infrared spectroscopy is being advantageously used in various industries.

An example of such infrared spectroscopy is an infrared spectroscopy spectrum analysis method using an attenuated total reflection method (hereinafter, referred to as IR-ATR). IR-ATR is a technique in which the spectrum of an inspection target contacting an ATR crystal while light passes through the crystal is measured, and is advantageously applicable to various inspection samples. IT-ATR is useful for accurately obtaining chemical information of the surface of the inspection target, and being capable of measuring without preprocessing.

IR-ATR performs measurements through contact between the inspection target and the crystal, and the spectrum strength may vary according to the contact degree (or contact pressure). Thus, the contact degree between the inspection target and the crystal serves as an important factor for analysis accuracy.

When there is a change in the structure of the inspection target due to reaction or the like, it is necessary to quantitatively check the degree of change. When analyzing the change using IR-ATR, the spectrum strength may vary according to the contact degree, unless the contact degree is known or maintained the same, and thus a large error is generated. Consequently, accurate analysis results cannot be obtained. Thus, it is necessary to develop an analysis method in which error is reduced by reducing a change in the spectrum strength of an inspection target due to a change in contact degree.

An aspect of the present invention provides a method for analyzing an infrared spectroscopy spectrum of a polyacrylonitrile-based fiber with reduced error by correcting a contact degree between an attenuated total reflection crystal and an inspection target.

According to an aspect of the present invention, there is provided a method of characterizing a polyacrylonitrile-based fiber, the method including: measuring an infrared spectroscopy spectrum using an attenuated total reflection method for an inspection target (step 1); and correcting a C≡N peak height in the infrared spectroscopy spectrum through Equations 1 and 2 below using the measured spectrum (step 2):

$$\text{Peak height correction value} = \frac{B_2}{C} \qquad [\text{Equation 1}]$$

$$C = \frac{A_2 - \left(A_1 \times \frac{B_2}{B_1}\right)}{A_0} \qquad [\text{Equation 2}]$$

in Equations 1 and 2, $A_0, A_1, A_2, B_1$ and $B_2$ are respective measured peak height values of the infrared spectroscopy spectrum, $A_0$ is a C—H peak height of a nonvolatile liquid material, $A_1$ is a C—H peak height of a polyacrylonitrile-based fiber, $A_2$ is a C—H peak height of the polyacrylonitrile-based fiber infiltrated by the nonvolatile liquid material, $B_1$ is a C≡N peak height of the polyacrylonitrile-based fiber, and $B_2$ is a C≡N peak height of the polyacrylonitrile-based fiber infiltrated by the nonvolatile liquid material, wherein the nonvolatile liquid material is one or more selected from among paraffin oil, aliphatic ester compounds, aliphatic ether compounds, and aliphatic alcoholic compounds.

In a method for analyzing an infrared spectroscopy spectrum of a polyacrylonitrile-based fiber according to the present invention, the contact degree between an inspection target and an attenuated total reflection crystal is predicted through Equation 2 and is applied to Equation 1 to correct a spectrum peak height, and thus, the peak height of an infrared spectroscopy spectrum may be measured with repeatability.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted as being limited to only the subject matter in the drawings.

DETAILED DESCRIPTION

Figure 1:
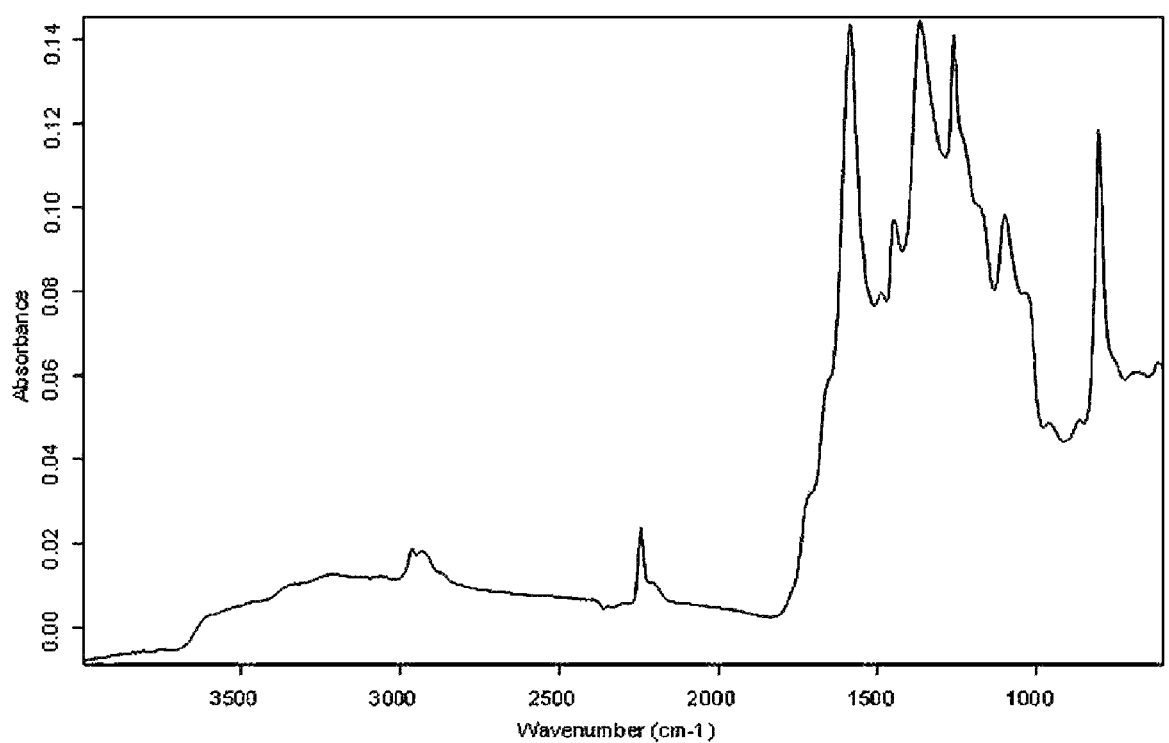
FIG. 1 shows a spectrum obtained by an IR-ATR measurement of a first inspection target in example 1 according to an embodiment of the present invention.
Figure 2:
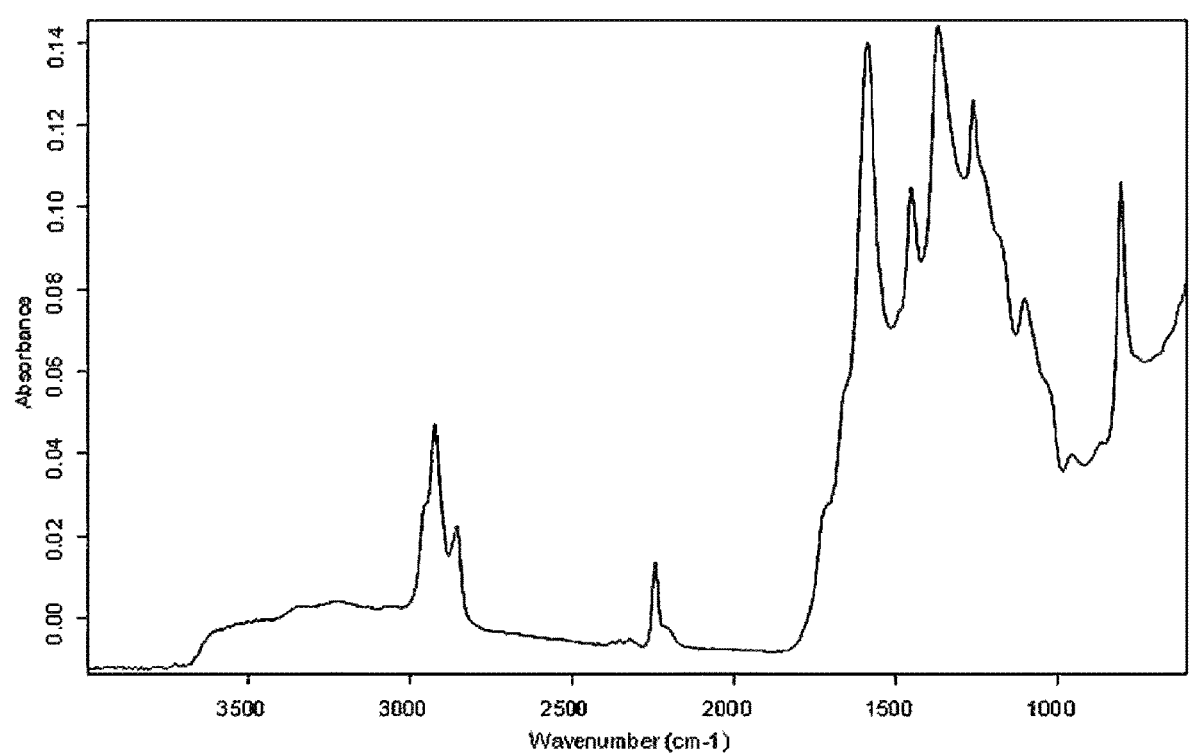
FIG. 2 shows a spectrum obtained by an IR-ATR measurement of a second inspection target in example 1 according to an embodiment of the present invention.
Figure 3:
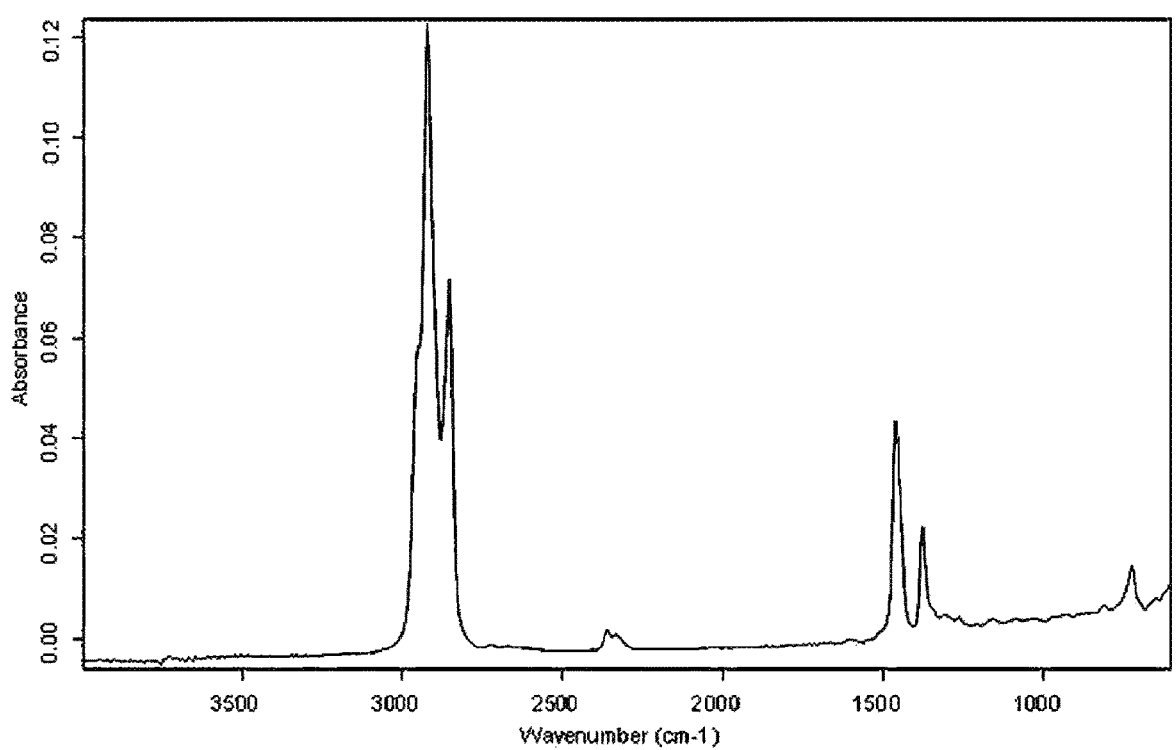
FIG. 3 shows a spectrum obtained by an IR-ATR measurement of a third inspection target in example 1 according to an embodiment of the present invention.

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The present invention provides a method for analyzing an infrared spectroscopy spectrum for a polyacrylonitrile-based fiber with a reduced error by correcting a contact degree between an attenuated total reflection crystal and an inspection target.

According to an embodiment of the present invention, there is provided a method of characterizing polyacrylonitrile-based fibers, the method including: measuring an infrared spectroscopy spectrum using an attenuated total reflection method for an inspection target (step 1); and correcting a C≡N peak height in the infrared spectroscopy spectrum through Equations 1 and 2 below using the measured spectrum (step 2):

$$\text{Peak height correction value} = \frac{B_2}{C} \quad \text{[Equation 1]}$$

$$C = \frac{A_2 - \left(A_1 \times \frac{B_2}{B_1}\right)}{A_0} \quad \text{[Equation 2]}$$

in Equations 1 and 2, $A_0$, $A_1$, $A_2$, $B_1$ and $B_2$ are respective measured peak height values of the infrared spectroscopy spectrum, $A_0$ is the C—H peak height of a nonvolatile liquid material, $A_1$ is the C—H peak height of a polyacrylonitrile-based fiber, $A_2$ is the C—H peak height of the polyacrylonitrile-based fiber infiltrated by the nonvolatile liquid material, $B1$ is the C≡N peak height of the polyacrylonitrile-based fiber, and $B_2$ is the C≡N peak height of the polyacrylonitrile-based fiber infiltrated by the nonvolatile liquid material, and here, the nonvolatile liquid material is one or more selected from among paraffin oil, an aliphatic ester compound, an aliphatic ether compounds, and an aliphatic alcoholic compound.

Here, the aliphatic ester compound may be vegetable oil such as soybean oil or corn oil, dioctyl adipate, dioctyl sebacate, or dioctyl azelate, the ether compound may be dioctylether, dihexylether, or dibutylether, and the aliphatic alcoholic compound may be octanol, hexanol, or butanol.

Step 1 is a step for irradiating an inspection target with light and measuring an infrared spectroscopy spectrum in which an attenuated total reflection method is applied.

Specifically, the infrared spectroscopy spectrum is obtained by using infrared spectrometers to the respective total of three inspection targets, and each of the inspection targets may be a first inspection target sampled from a polyacrylonitrile-based fiber, a second inspection target in which the first inspection target is infiltrated by a nonvolatile liquid material, and a third inspection target which is a nonvolatile liquid material. In this case, the nonvolatile liquid material may specifically be paraffin oil.

In addition, the infrared spectroscopy spectrum may be obtained by bringing the inspection target into contact with an attenuated total reflection crystal, irradiating the inspection target with light through the attenuated total reflection crystal, and detecting the light emitted from the attenuated total reflection crystal, and the attenuated total reflection crystal may be, for example, germanium.

The infrared spectroscopy spectrum of the third inspection target may be obtained by directly applying (dropping) the third inspection target to the attenuated total reflection crystal to bring the attenuated total reflection crystal and the third inspection target into contact with each other.

In addition, the infrared spectroscopy spectrum according to an embodiment of the present invention may be obtained by an infrared spectrometer through an attenuated total reflection method at a resolution of about 8 cm$^{-1}$ and the number of scans of about 64 within a wave number range of about 600 cm$^{-1}$ to about 4,000 cm$^{-1}$.

According to a specific embodiment of the present invention, the infrared spectroscopy spectrum was measured such that a microscopic infrared spectrometer (made by Bruker Co.) is used for the inspection target by selecting a resolution of about 8 cm$^{-1}$, the number of scans of about 64, and an ATR tip pressure of medium. The C—H peak height was measured at about 2,923 cm$^{-1}$, a baseline was selected as a straight line at about 2,600 cm$^{-1}$ and about 3,155 cm$^{-1}$, the C≡N peak height was measured at about 2,243 cm$^{-1}$, and the baseline was selected as a straight line at about 2,100 cm$^{-1}$ and about 2,280 cm$^{-1}$.

In the present invention, the attenuated total reflection method is method for measuring a change occurring in the internally reflected light when infrared light contacts an inspection target. Specifically, when the inspection target and a transparent material with a high refractive index are brought into contact with each other, and incident light is applied from the transparent material side, a total reflection occurs. However, since the reflected light is absorbed by very slight portion of inspection target adjacent to a contact surface, the absorption characteristic of the inspection target should be reflected, and a method for spectroscopy measurement using this phenomenon is referred to as an attenuated total reflection method.

Step 2 is a step for correcting the peak height of the infrared spectroscopy spectrum through Equations 1 and 2 using the infrared spectroscopy spectrum to which the attenuated total reflection method is applied.

In the present invention, Equations 1 and 2 are equations derived such that five sample pieces are obtained from a bundle of polyacrylonitrile-based fiber. Through a preliminary experiment, first, second, and third inspection targets are sampled from the respective sample pieces, infrared spectroscopy spectrums to which the attenuated total reflection method is applied are obtained for the respective inspection targets, and a calculation equation is derived by using the C—H peak height and the C≡N peak height in the spectrums as variables. Then, the return of a corrected value to a constant value is confirmed. In this case, as described above, among the first, second, and third inspection targets, the first inspection target is sampled from the polyacrylonitrile-based fiber, the second inspection target is an inspection target infiltrated by a nonvolatile liquid material, and the third inspection target is a nonvolatile liquid material.

In an embodiment of the present invention, the polyacrylonitrile-based fiber may be any one among a polyacrylonitrile-based precursor fiber and a polyacrylonitrile-based stabilized fiber, and here, the polyacrylonitrile-based precursor fiber represents a fibrosis polyacrylonitrile-based copolymer, and the polyacrylonitrile-based stabilized fiber may be manufactured by stabilizing and reacting the polyacrylonitrile-based precursor fiber.

Specifically, the polyacrylonitrile-based precursor fiber may be a fibrosis polyacrylonitrile-based copolymer which is manufactured such that a polyacrylonitrile-based copolymer is manufactured by polymerizing, for example, an acrylonitrile-based monomer and a carboxylic acid-based comonomer, and the manufactured copolymer is subjected to fibrosis.

Here, the acrylonitrile-based monomer may be acrylonitrile, the carboxylic acid-based comonomer may be one or more selected from, or selected from the group consisting of acrylic acid, methacrylic acid, ethacrilic acid, itaconic acid, crotonic acid, citraconic acid, maleic acid, and mesaconic acid.

In addition, the polyacrylonitrile-based copolymer may include: about 95 wt % to about 99 wt % of repeating units derived from the acrylonitrile-based monomer; and about 1 wt % to about 5 wt % of repeating units derived from the carboxylic acid-based comonomer.

In addition, the fibrosis polyacrylonitrile-based copolymer may be manufactured by applying the polyacrylonitrile-based copolymer to a spinning process or the like so as to have a fiber shape. For example, a spinning solution is prepared by dissolving the polyacrylonitrile-based copolymer into a solvent, which can dissolve the polyacrylonitrile-based copolymer, and is spun through a dry spinning, wet spinning, or dry and wet spinning to manufacture the fibrosis polyacrylonitrile-based copolymer.

The solvent, which can dissolve the polyacrylonitrile-based copolymer, is not particularly limited, and may be, for example, dimethylsulfoxide, dimethylformamide, or dimethylacetamide. In addition, the spinning solution may be manufactured by adjusting the concentration of the fibrosis polyacrylonitrile-based copolymer to be about 10 wt % to about 40 wt %.

In addition, the wet spinning or the dry and wet spinning may be initiated by adding a spinning raw solution into a solidification tank and solidifying, and the solidification tank may contain the solvent of the spinning raw solution and a solidification promoter.

After the solidification, a water cleaning process and an elongation process may be performed, and these two processes may be sequentially or continuously performed, or may be performed in the reverse order.

In addition, processes such as drying and heat treatment or steam elongation may further be performed, and through this, the fibrosis polyacrylonitrile-based copolymer may be manufactured.

The polyacrylonitrile-based stabilized fiber may be manufactured by stabilizing the polyacrylonitrile-based precursor fiber. Here, the stabilization is a process for imparting heat resistance to the polyacrylonitrile-based precursor fiber, may be performed through heat treatment performed within a temperature range of about 180° C. to about 350° C. while applying a constant tension under an oxidative or air atmosphere. Thus, low molecular materials among the components constituting the polyacrylonitrile-based precursor fiber are removed and change of chemical structure occurs, and the polyacrylonitrile-based stabilized fiber to which heat resistance is imparted may be manufactured.

Hereinafter the present invention will be described in more detail through examples. However, the following examples are merely for illustrating the present invention, and the scope of the present invention is not limited to the samples.

Hereinafter in the examples, the polyacrylonitrile-based fiber was polyacrylonitrile-based stabilized fiber stabilized with a product of Jilin co. containing about 96 wt % of acrylonitrile, about 3 wt % of methylmethacrylate, and about 1 wt % of itaconic acid.

Examples 1 to 5

An analysis of an infrared spectroscopy spectrum of a polyacrylonitrile-based fiber was performed, spectrum peaks before and after correction were compared, and in this case, five samples were sampled (sampled at different locations) from a bundle of polyacrylonitrile-based fiber and used as inspection targets. Results are shown in Table 1 below.

Specifically, for each of the stabilized fibers, an infrared spectroscopy spectrum was obtained to which an attenuated total reflection method was applied by using a microscopic infrared spectrometer (made by Bruker Co.) and using three inspection targets, as described below. Specifically, a resolution of about 8 $cm^{-1}$, 64 scans, an ATR tip pressure of medium was selected, and spectroscopy performed. A C—H peak height was measured at 2,923 $cm^{-1}$ with a base line selected as a straight line between about 2,600 $cm^{-1}$, and about 3,155 $cm^{-1}$, a C≡N peak height was measured at 2,243 $cm^{-1}$ with a baseline selected as a straight line between about 2,100 $cm^{-1}$, and about 2,280 $cm^{-1}$.

A first inspection target: a sample sampled from the fiber.

A second inspection target: a sample prepared by infiltrating paraffin oil into the first inspection target.

A third inspection target: a sample to which paraffin oil is applied (dropped) onto an attenuated total reflection crystal.

Specifically, each of the inspection targets was brought into contact with the attenuated total reflection crystal (germanium (Ge)), the inspection targets were irradiated by light, and then, the light reflected from the crystal was detected and measured.

TABLE 1

| Division | C≡N Peak height before correction ($B_2$) | Contact degree(C.) | C≡N Peak height after correction |
|---|---|---|---|
| Example 1 | 0.0203 | 0.689 | 0.0295 |
| Example 2 | 0.0152 | 0.496 | 0.0306 |
| Example 3 | 0.0232 | 0.783 | 0.0296 |
| Example 4 | 0.0216 | 0.712 | 0.0303 |
| Example 5 | 0.0231 | 0.771 | 0.0300 |

In Table 1 above, the contact degree C. was a value calculated through Equation 2 below, and the C≡H peak height after correction was calculated through Equation 1.

$$\text{Peak height correction value} = \frac{B_2}{C} \quad \text{[Equation 1]}$$

$$C = \frac{A_2 - \left(A_1 \times \frac{B_2}{B_1}\right)}{A_0} \quad \text{[Equation 2]}$$

In Equations 1 and 2, $A_0, A_1, A_2, B_1$ and $B_2$ are respective measured peak height values of the infrared spectroscopy spectrum, $A_0$ is the C—H peak height of a nonvolatile liquid material, $A_1$ is the C—H peak height of the first inspection target, $A_2$ is the C—H peak height of the second inspection target, $B_1$ is the C≡N peak height of the first inspection target, and $B_2$ is the C≡N peak height of the second inspection target.

As shown in Table 1 above, it was confirmed that the C≡N peak height in the infrared spectroscopy spectrum was corrected through Equations 1 and 2 to thereby return to a constant value unlike the C≡N peak height before correction.

The invention claimed is:

1. A method for characterizing a polyacrylonitrile-based fiber, the method comprising:

1) measuring an infrared spectroscopy spectrum of an inspection target to which an attenuated total reflection method is applied; and 2) correcting a C≡N peak height in the infrared spectroscopy spectrum through Equations 1 and 2 below using the measured spectrum:

$$\text{Peak height correction value} = \frac{B_2}{C} \quad \text{[Equation 1]}$$

$$C = \frac{A_2 - \left(A_1 \times \frac{B_2}{B_1}\right)}{A_0} \quad \text{[Equation 2]}$$

in Equations 1 and 2, $A_0, A_1, A_2, B_1$ and $B_2$ are respective measured peak height values of the infrared spectroscopy spectrum, $A_0$ is a C—H peak height of a nonvolatile liquid material, $A_1$ is a C—H peak height of a polyacrylonitrile-based fiber, $A_2$ is a C—H peak height of the polyacrylonitrile-based fiber infiltrated by the nonvolatile liquid material, $B_1$ is a C≡N peak height of the polyacrylonitrile-based fiber, and $B_2$ is a C≡N peak height of the polyacrylonitrile-based fiber infiltrated by the nonvolatile liquid material, wherein the nonvolatile liquid material is one or more selected from: paraffin oil, aliphatic ester compounds, aliphatic ether compounds, and aliphatic alcoholic compounds.

2. The method of claim 1, wherein the nonvolatile liquid material is paraffin oil.

3. The method of claim 1, wherein in step 1) above, the infrared spectroscopy spectrum is obtained for each of a total of three inspection targets by measuring with an attenuated total reflection method using an infrared spectrometer, and the inspection targets are a first inspection target sampled from a polyacrylonitrile-based fiber, a second inspection target obtained by infiltrating a nonvolatile liquid material into the first inspection target, and a third inspection target which is a nonvolatile liquid material, respectively.

4. The method of claim 1, wherein the infrared spectroscopy spectrum is obtained by bringing the inspection targets into contact with an attenuated total reflection crystal, irradiating the inspection targets with light, and then detecting and measuring the light reflected from the attenuated total reflection crystal.

5. The method of claim 4, wherein the attenuated total reflection crystal is germanium.

6. The method of claim 1, wherein the infrared spectroscopy spectrum is obtained by measuring with the attenuated total reflection method at a wave number range of about 600 $cm^{-1}$ to about 4,000 $cm^{-1}$, a resolution of about 8 $cm^{-1}$, and a number of scans of about 64, using an infrared spectrometer.

* * * * *